US008880432B2

(12) United States Patent
Collins, Jr.

(10) Patent No.: US 8,880,432 B2
(45) Date of Patent: Nov. 4, 2014

(54) SYSTEM AND METHOD OF USING ELECTRONIC FUNDS TRANSFER TO COMPLETE PAYMENT FOR GOODS AND SERVICES

(75) Inventor: Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 45 days.

(21) Appl. No.: 13/483,963

(22) Filed: May 30, 2012

(65) Prior Publication Data

US 2013/0325661 A1    Dec. 5, 2013

(51) Int. Cl.
*G06Q 20/00* (2012.01)
(52) U.S. Cl.
USPC .............. 705/64; 705/35; 705/36; 705/37; 705/38; 705/39; 705/40; 705/41; 705/42; 705/43; 705/44; 705/45; 705/46; 705/76; 705/77; 705/78; 713/150; 713/168
(58) Field of Classification Search
USPC .............................................. 705/64, 35–45
See application file for complete search history.

(56) References Cited

U.S. PATENT DOCUMENTS

| 7,159,770 B2 * | 1/2007 | Onozu ........................ 235/383 |
| 7,784,684 B2 * | 8/2010 | Labrou et al. .................. 705/64 |
| 2013/0256421 A1 * | 10/2013 | Johnson et al. ................ 705/35 |

* cited by examiner

*Primary Examiner* — Calvin L Hewitt, II
*Assistant Examiner* — Cristina Owen Sherr
(74) *Attorney, Agent, or Firm* — Paul W. Martin

(57) ABSTRACT

A system and method of using Electronic Funds Transfer (EFT) to complete payment for goods and services. An example method of operating a transaction terminal includes identifying items selected by a customer for purchase, determining a required payment amount for the items, obtaining identification information from the customer, obtaining contact information and payment information, including bank account information and bank routing number information, from a customer profile associated with the identification information, creating a check image, sending a request for payment message providing access to the check image and the payment information to a mobile communication device of the customer using the contact information in the customer profile, and receiving a reply message from the mobile communication device authorizing payment for the items via electronic funds transfer and including a 2D barcode containing the check image and the payment information.

4 Claims, 4 Drawing Sheets

SYSTEM AND METHOD OF USING ELECTRONIC FUNDS TRANSFER TO COMPLETE PAYMENT FOR GOODS AND SERVICES

BACKGROUND

This present invention relates to transaction methods and more specifically to a system and method of using Electronic Funds Transfer (EFT) processes to complete payment for goods and services.

Credit cards are easily stolen and used fraudulently to buy goods or services. Credit card services are also expensive.

An alternative to credit cards is EFT. The Automated Clearing House (ACH) system processes credit and debit transactions through EFT. An example credit transaction is payments to businesses from customers. EFT is relatively less expensive and payments can be run in batch mode during off-peak hours.

It would be desirable to provide a system and method of completing payment at a lower cost and with a higher level of security than credit cards.

SUMMARY

In accordance with the teachings of the present invention, a system and method of using Electronic Funds Transfer (EFT) processes to complete payment for goods and services is provided.

An example method includes identifying items selected by a customer for purchase by a transaction terminal, determining a required payment amount for the items, obtaining identification information from the customer, obtaining contact information and payment information, including bank account information and bank routing number information, from a customer profile associated with the identification information, creating a check image, sending a request for payment message providing access to the check image and the payment information to a mobile communication device of the customer using the contact information in the customer profile, and receiving a reply message from the mobile communication device authorizing payment for the items via electronic funds transfer and including a 2D barcode containing the check image and the payment information.

An example method of operating a mobile communication device of a customer includes receiving a request for payment message from a transaction terminal, wherein the request for payment message provides access to payment information from a profile of the customer and to a check image, displaying a payment screen containing the check image, the payment information, and an authorize payment selection element, recording customer selection using the authorize payment selection element, creating a 2D barcode containing the check image and the payment information, and sending a reply message authorizing payment for the items via electronic funds transfer and containing the 2D barcode to the transaction terminal by the mobile communication device.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
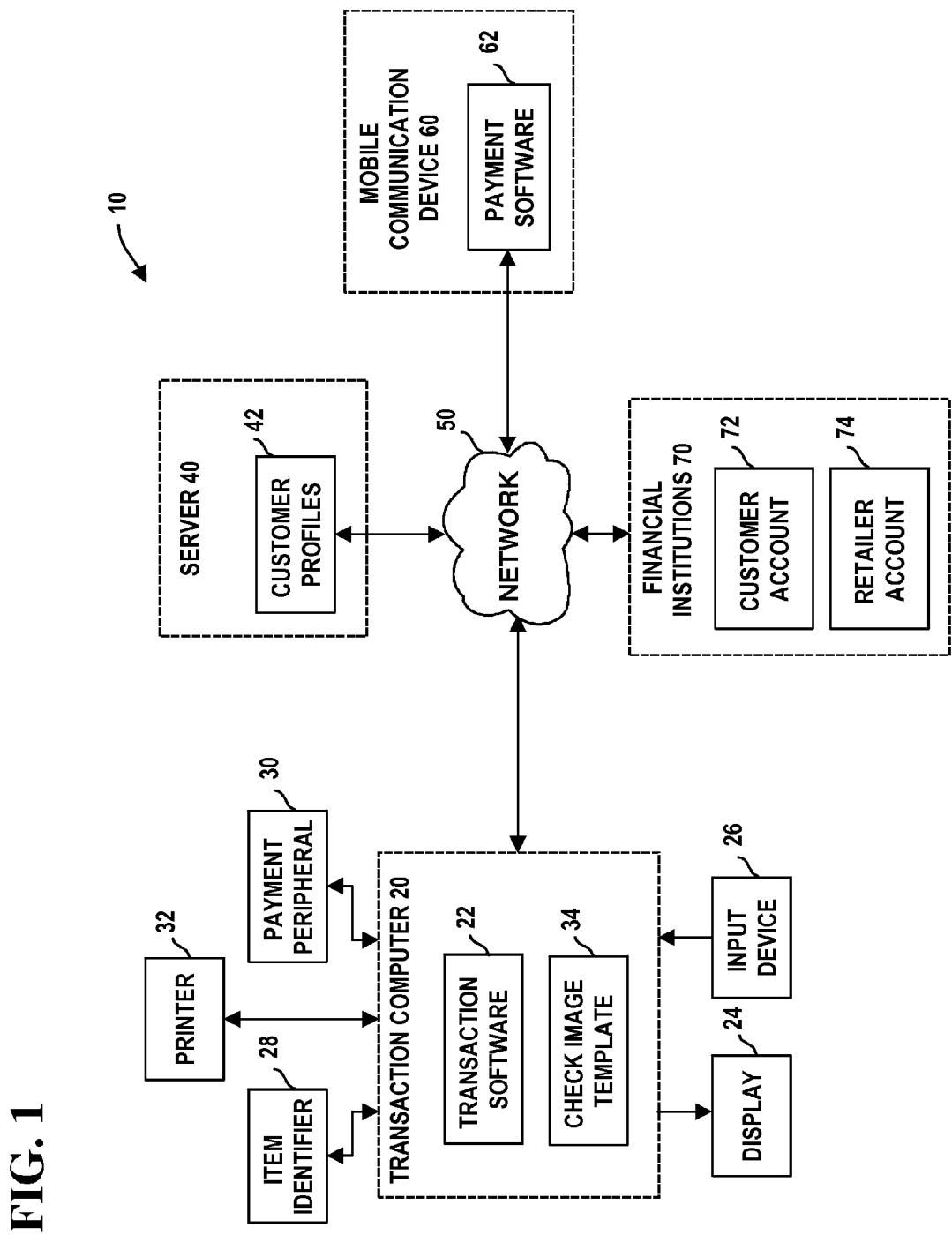
FIG. 1 is a block diagram illustrating an example transaction system.

Referring now to FIG. 1, example transaction system 10 includes transaction computer 20, server 40, mobile communication device 60 and financial institution computers 70.

Transaction computer 20 executes transaction software 22 which displays transaction screens using display 24 for guiding an operator through a transaction, receives operator inputs and selections during the transaction from input device 26, receives item identification information from item identifier 28, and prints receipts using printer 32.

An example Input device 26 may include a keyboard or keypad. Alternatively, input device 26 may be combined with display 24 as a touch screen.

An example item identifier 28 may include a barcode reader and/or radio frequency identification (RFID) reader. The barcode reader may include a scale for weighing non-barcoded items, such as produce items. Transaction software 22 sends item identification information to server 40 via network 50 to obtain price information and enters the price information into the transaction.

An example printer 32 prints receipts and optionally other documents, such as promotions.

Transaction computer 20 may additionally include one or more payment peripherals 30 for completing payment using credit or debit cards and using cash money, including currency and coins. An example payment peripheral 30 may include a card reader, personal identification number (PIN) keypad, and/or a signature pad.

Transaction software 22 is additionally capable of completing payment via Electronic Funds Transfer (EFT) using Automated Clearing House (ACH) processes. Transaction software 22 obtains customer permission to perform a transfer of funds using EFT to pay for items of a transaction from the customer's account 72 at the customer's financial institution computer 70 to the retailer's account 74 at the retailer's financial institution computer 70.

In an example embodiment, transaction software 22 creates an image of a check using account information from customer profile 42, and sends the check image to mobile communication device 60 in a message. Transaction software 22 addresses the message using contact information from customer profile 42. Transaction software 22 may alternatively store the check image in server 40 and provide a link to the check image in the message.

Transaction software 22 may use a check image template 34 containing fields that transaction software 22 populates to complete payment. Required fields include the account number associated with customer account 72, the bank routing number associated with the customer's financial institution 70, a check amount or the amount of the transaction, and a check number. Transaction software 22 may require that additional check fields by populated, such as payer name, payee name, and date.

Transaction software 22 obtains the account number and bank routing number from customer profile 42. Transaction software 22 fills the amount field with the total payment required from the transaction and generates a check number for the check number fields.

Transaction software 22 receives a customer response message from mobile communication device 60 authorizing payment, and sends payment information to the financial institution computer 70 of the retailer to process the payment from financial institution computer 70 of the customer using EFT. An example response from mobile communication device 60 may include a two-dimensional (2D) barcode representing the check image, including the account number, the bank routing number, the amount, and the check number.

Transaction computer 20 includes one or more processors, memory, and program and data storage. Transaction computer 20 may execute an operating system such as a Microsoft or other operating system. Transaction computer 20 may execute other computer software that may be stored in a computer readable medium, such as a memory. Transaction computer 20 may be coupled to other computers, including server 40, mobile communication device 60, and financial institution computers 70 via network 50. Transaction computer 20 may also be capable of sending and receiving messages, including but not limited to electronic mail (e-mail) messages, Short Message Service messages (text messages), and Multimedia Message Service messages (multimedia messages). Transaction computer 20 further includes graphics circuitry for providing display screens to display 24, network circuitry for connecting to the network 50, and other circuitry for connecting to other peripherals.

Server 40 provides price information to transaction software 22 during a transaction. Server 40 additionally stores customer profiles 42, which include customer information necessary for completing payments via EFT. The customer information may include contact information, a bank account number, and a bank routing number. Customers can signup to participate in this type of payment process by connecting to server 40 from a home computer or from mobile communication device 60.

The functions of server 40 may be completed by one or more separate computers, each with one or more processors, memory, and program and data storage. Server 40 may execute an operating system such as a Microsoft or other operating system. Server 40 may execute other computer software that may be stored in a computer readable medium, such as a memory. Server 40 may be coupled to other computers including transaction computer 20, mobile communication device 60, and financial institution computers 70 via network 50, and include a web server connected to the World Wide Web (WWW or "web"). Server 40 may provide payment software 42 and web content, including web pages for capturing customer information for storage in customer profiles 42.

Network 50 may include one which uses the TCP/IP protocol. Network 50 may include a combination of local area and wide area networks. Network 50 may include any combination of wireless or wired networks. Network 50 may include a combination of private and public networks, including a global communication network, also known as the Internet.

Mobile communication device 60 participates in a check payment in which the customer uses mobile communication device 60 to authorize payment for purchased items during a transaction. Mobile communication device 60 receives a message from transaction software 22 containing a check with information from customer profile 42. Mobile communication device 60 obtains a customer response authorizing payment, and sends a reply with the authorization to transaction software 22.

In the example embodiment, mobile communication device 60 receives the check image, or a link to the check image, in the message from transaction software 22. Mobile communication device 60 creates the 2D barcode from the check image and the account number, bank routing number, amount, and check number, and sends the 2D barcode to transaction software 22.

Mobile communication device 60 may include, but not be limited to, a smart phone, personal digital assistant, or other portable communication device. Mobile communication device 60 includes one or more processors, memory, and program and data storage. Mobile communication device 60 may execute an operating system. Mobile communication device 60 may execute other computer software, such as web browser software to display web pages from server 40, which may be stored in a computer readable medium, such as a memory.

Mobile communication device 60 further includes graphics circuitry for connecting to a display, network circuitry for connecting to network 50, and other circuitry for connecting to other peripherals, such as an input device (e.g., a touch overlay to the display).

Mobile communication device 60 may download application software to interact with transaction software 22, to present the check image, and/or to create the 2D barcode. For example, server 40 may provide payment software 42 for download from the web site hosted by server 40.

In one example, payment software 42 may be written in a programming language such as the Java programming and be hosted within the browser software.

As another example, payment software 42 may include a script, such as JavaScript, combined with hypertext markup language (HTML) or other suitable web page language.

As another example, payment software 42 may include a software applet written to be executed within the operating system of the smart phone.

Financial institution computers 70 process EFT payments from a customer to a retailer. The financial institution computer 70 associated with a financial institution or bank of the retailer receives customer authorization from transaction software 22 in the form of a 2D barcode of the check image, identifies the financial institution or bank of the customer from the information in the 2D barcode, and contacts the financial institution computer 70 associated with the financial institution or bank of the customer. Financial institution computers 70 complete an EFT process to transfer funds in the amount of the authorized payment from a customer account 72 at the retailer's bank to a retailer account 74 at the retailer's bank.

Figure 2:
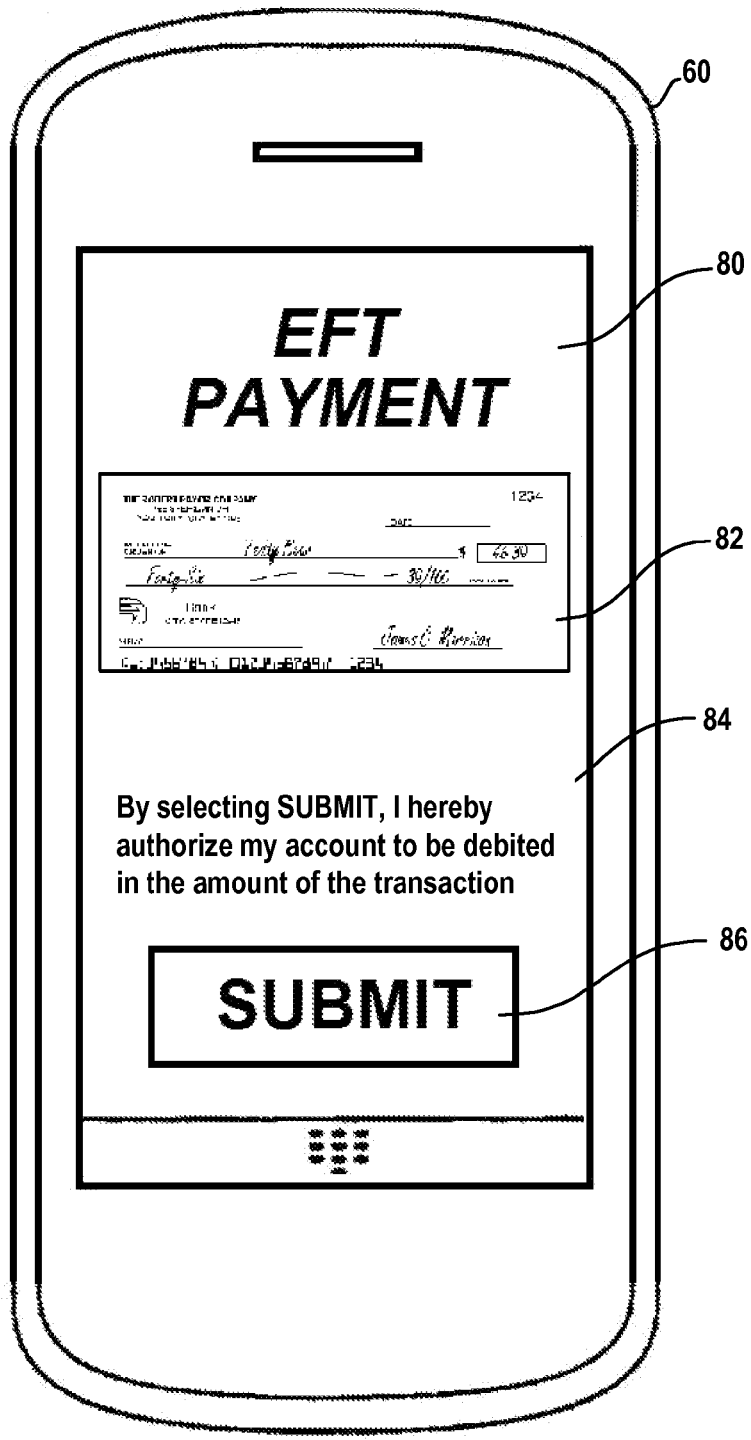
FIG. 2 illustrates a mobile communication device and example display screen.

Referring now to FIG. 2, an example mobile communication device 60 includes a smart phone. Mobile communication device 60 displays screen 80 with an example title, "EFT PAYMENT", following receipt of a message from transaction software 22. Screen 80 includes an image 82 of a check. An example check image is populated with the amount of the transaction, the date, and the retailer's name in the "pay to the order of" line. Screen 80 also includes an acceptance statement 84 and a submit button 86. In an example embodiment, screen 80 is created by payment software 42, which also creates a response acceptance 2D barcode and causes mobile communication device 60 to send a return payment authorization message to transaction software 22 containing the response acceptance 2D barcode when the customer selects submit button 86.

Figure 3A:
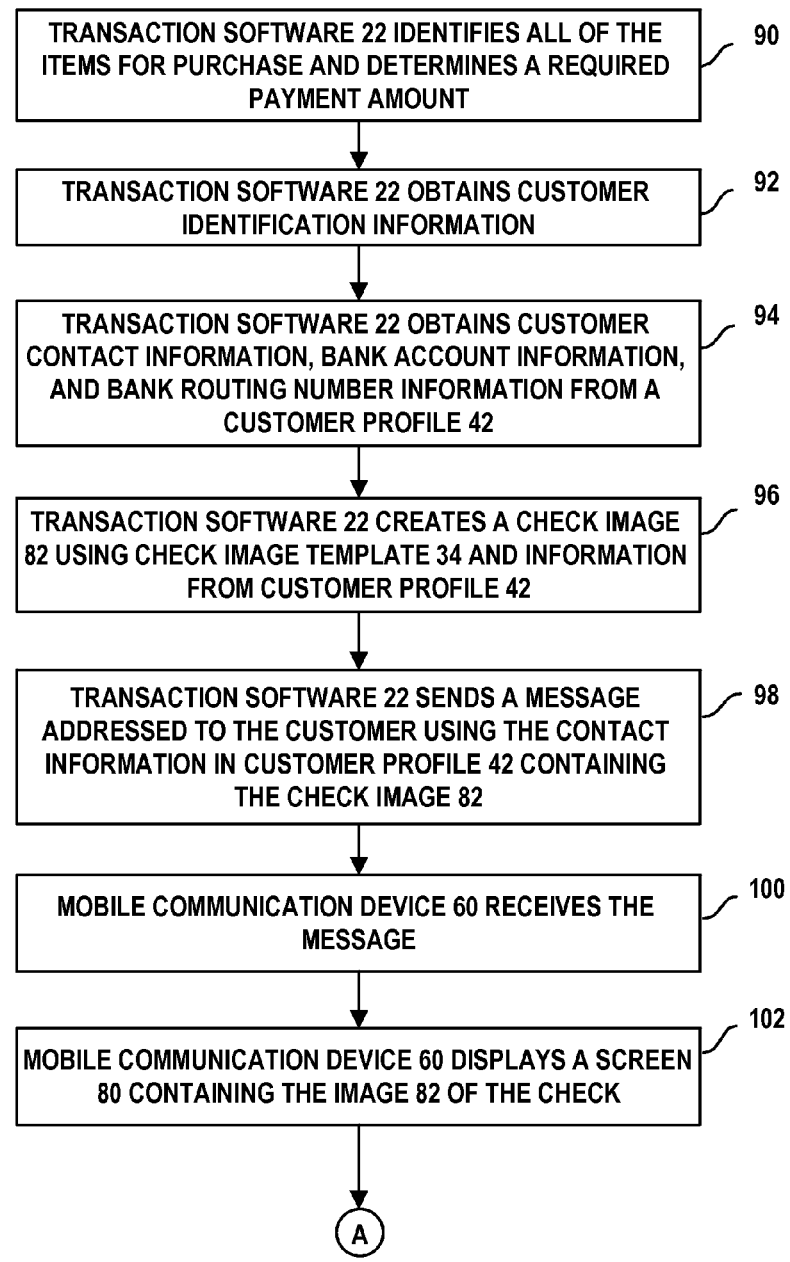
FIGS. 3A-3B form a flow diagram illustrating an example transaction method.
Figure 3B:
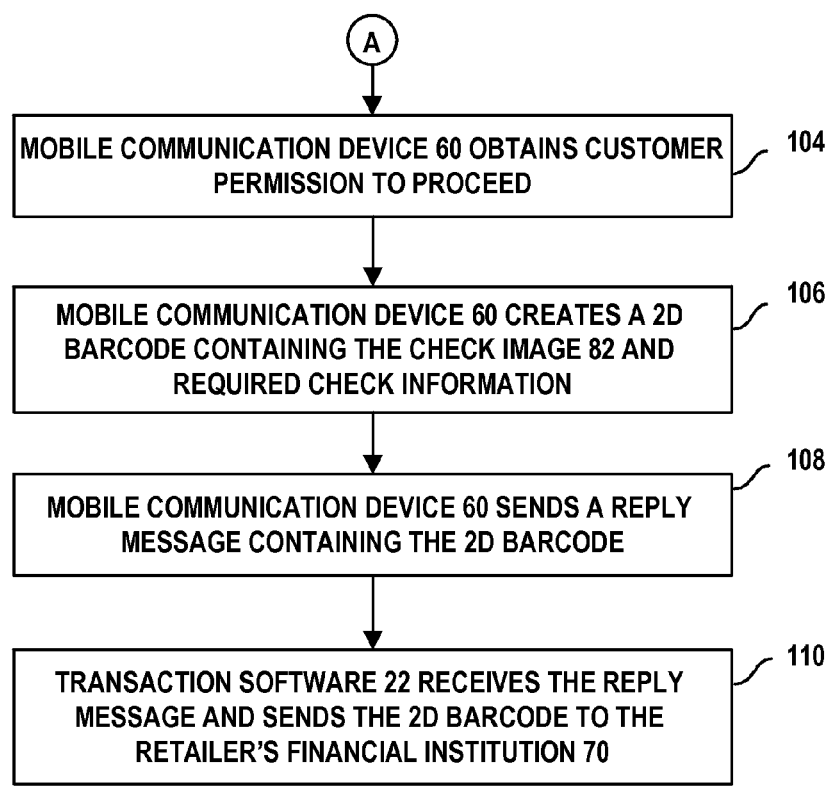

Referring now to FIGS. 3A-3B, an example transaction method is illustrated.

In step 90, transaction software 22 identifies all of the items for purchase and determines a required payment amount.

In step 92, transaction software 22 obtains customer identification information from the customer, who has elected to pay using EFT. An example form of identification may include a loyalty card, which may be read by a card reader.

In step 94, transaction software 22 obtains customer contact information, bank account information, and bank routing number information from a customer profile 42 associated with the customer identification information obtained from the loyalty card.

In step 96, transaction software 22 creates a check image 82 using check image template 34 and information from customer profile 42.

In step 98, transaction software 22 sends a message addressed to the customer using the contact information in customer profile 42 containing the check image 82.

In step 100, mobile communication device 60 receives the message.

In step 102, mobile communication device 60 displays a screen 80 containing the image 82 of the check.

In step 104, mobile communication device 60 obtains customer permission to proceed when the customer selects the submit button 86.

In step 106, mobile communication device 60 creates a 2D barcode containing the check image 82 and required check information, including the account number, the bank routing number, the amount, and the check number.

In step 108, mobile communication device 60 sends a reply message containing the 2D barcode to transaction software 22.

In step 110, transaction software 22 receives the reply message and sends the 2D barcode to the retailer's financial institution 70 with a request to complete an EFT payment from the customer's account 72 to the retailer's account 74.

Transaction software 22 may print a receipt using printer 32.

Advantageously, the retailer is able to receive payment at a lower cost than the cost of processing a credit card transaction and has more assurance that the customer owns the information used to provide payment. The customer has avoided problems associated with theft of credit card information.

Although the present invention has been described with particular reference to certain preferred embodiments thereof, variations and modifications of the present invention can be effected within the spirit and scope of the following claims.

What is claimed is:

1. A method of operating a mobile communication device of a customer to complete a transaction involving items selected for purchase from a business by the customer, the method comprising:
   receiving a request for payment message from a transaction terminal of the business by a mobile communication device of the customer, wherein the request for payment message provides access to payment information from a profile of the customer and to a check image;
   displaying by the mobile communication device a payment screen containing the check image, the payment information, and an authorize payment selection element;
   recording customer selection using the authorize payment selection element by the mobile communication device;
   creating a 2D barcode using the check image and the payment information by the mobile communication device; and
   sending a reply message authorizing payment for the items via electronic funds transfer and containing the 2D barcode to the transaction terminal by the mobile communication device.

2. The method of claim 1, wherein the request for payment message contains the check image and the payment information.

3. The method of claim 1, wherein the request for payment message contains a link to the check image and the payment information.

4. The method of claim 1, wherein the payment information is included in the check image.

* * * * *